US012593858B2

(12) United States Patent
Grudke-Katschus et al.

(10) Patent No.: US 12,593,858 B2
(45) Date of Patent: Apr. 7, 2026

(54) SAVOURY COMPOSITION

(71) Applicant: Conopco Inc., Englewood Cliffs, NJ (US)

(72) Inventors: Tanja Grudke-Katschus, Heilbronn (DE); Winfried Rupp, Heilbronn (DE); Regine Weimar, Heilbronn (DE)

(73) Assignee: Conopco Inc., Englewood Cliffs, NJ (US)

( * ) Notice: Subject to any disclaimer, the term of this patent is extended or adjusted under 35 U.S.C. 154(b) by 162 days.

(21) Appl. No.: 17/298,042

(22) PCT Filed: Dec. 13, 2019

(86) PCT No.: PCT/EP2019/085184
§ 371 (c)(1),
(2) Date: May 28, 2021

(87) PCT Pub. No.: WO2020/126939
PCT Pub. Date: Jun. 25, 2020

(65) Prior Publication Data
US 2022/0095655 A1      Mar. 31, 2022

(30) Foreign Application Priority Data

Dec. 20, 2018    (EP) ..................................... 18214409

(51) Int. Cl.
| | |
|---|---|
| *A23L 23/10* | (2016.01) |
| *A23L 5/00* | (2016.01) |
| *A23P 10/10* | (2016.01) |
| *A23P 30/10* | (2016.01) |

(52) U.S. Cl.
CPC ................. *A23L 23/10* (2016.08); *A23L 5/51* (2016.08); *A23L 5/55* (2016.08); *A23P 10/10* (2016.08); *A23P 30/10* (2016.08)

(58) Field of Classification Search
CPC ..... A23L 23/10; A23L 5/51–5/55; A23L 5/13; A23P 30/10; A23P 10/10
USPC ................................... 426/91, 134, 589, 512
See application file for complete search history.

(56) References Cited

U.S. PATENT DOCUMENTS

| | | | | |
|---|---|---|---|---|
| 2,278,466 | A | 4/1942 | Musher | |
| 2,954,296 | A | 9/1960 | Clausi et al. | |
| 3,154,418 | A * | 10/1964 | Lovell .................. | A47G 21/004 |
| | | | | 206/568 |
| 3,312,555 | A * | 4/1967 | Rainero, Jr. ............ | C13B 50/02 |
| | | | | 127/65 |
| 3,336,139 | A * | 8/1967 | Groncki .................. | A23P 10/28 |
| | | | | 426/573 |
| 3,360,121 | A * | 12/1967 | Zoeller .................. | B65D 81/00 |
| | | | | 206/820 |
| 3,373,042 | A | 3/1968 | Elerath et al. | |

| | | | | |
|---|---|---|---|---|
| 3,386,837 | A * | 6/1968 | Arnot ..................... | B65D 75/28 |
| | | | | 206/0.5 |
| 3,493,382 | A * | 2/1970 | Burns ................... | A23L 29/256 |
| | | | | 426/573 |
| 3,637,398 | A | 1/1972 | Elerath | |
| 3,804,960 | A | 4/1974 | Barnett et al. | |
| 3,869,555 | A * | 3/1975 | Heonis .................... | A23P 10/10 |
| | | | | 426/597 |
| 4,025,657 | A | 5/1977 | Cheng et al. | |
| 4,178,392 | A * | 12/1979 | Gobble .................. | A23L 7/115 |
| | | | | 426/103 |
| 4,225,627 | A | 9/1980 | Moore | |
| 4,418,090 | A | 11/1983 | Bohrmann et al. | |
| 4,578,274 | A | 3/1986 | Sugisawa et al. | |
| 5,589,214 | A | 12/1996 | Palm | |
| 5,863,583 | A * | 1/1999 | Altschul ................. | A23L 7/126 |
| | | | | 426/620 |
| 6,001,408 | A | 12/1999 | Dudacek et al. | |
| 6,017,388 | A | 1/2000 | Yuan | |
| 7,208,188 | B2 * | 4/2007 | Sakuma ............... | A23B 7/0205 |
| | | | | 426/385 |
| 7,794,771 | B2 | 9/2010 | Kessler | |
| 11,291,226 | B1 | 4/2022 | Shah et al. | |
| 2003/0033939 | A1 * | 2/2003 | Mahe ..................... | A23P 20/25 |
| | | | | 99/345 |
| 2006/0233924 | A1 * | 10/2006 | Nguyen ............... | A47G 21/004 |
| | | | | 426/134 |
| 2007/0054020 | A1 | 3/2007 | Kumagai | |
| 2007/0134397 | A1 * | 6/2007 | Eppler .................... | A23L 19/05 |
| | | | | 426/589 |
| 2007/0298154 | A1 * | 12/2007 | Aftoora ................... | A23L 23/10 |
| | | | | 426/578 |
| 2008/0113068 | A1 * | 5/2008 | Grimshaw .............. | A23P 10/28 |
| | | | | 426/577 |
| 2008/0166459 | A1 * | 7/2008 | Achterkamp ........... | A23L 27/14 |
| | | | | 426/589 |
| 2008/0299268 | A1 * | 12/2008 | Achterkamp ........... | A23L 23/10 |
| | | | | 426/589 |
| 2010/0028496 | A1 | 2/2010 | Barnekow et al. | |
| 2010/0143550 | A1 * | 6/2010 | Abdel-Fattah .......... | A23L 23/10 |
| | | | | 426/589 |
| 2010/0196584 | A1 * | 8/2010 | Dupart ................... | A23P 30/10 |
| | | | | 426/389 |
| 2011/0027429 | A1 | 2/2011 | Kogane | |
| 2012/0276271 | A1 | 11/2012 | Inoue et al. | |

(Continued)

FOREIGN PATENT DOCUMENTS

| | | |
|---|---|---|
| CA | 964074 | 3/1975 |
| CN | 103298357 | 9/2013 |

(Continued)

OTHER PUBLICATIONS

Anonymous; RTE FD SOUP process primary study; RTE FD SOUP process primary study; Feb. 14, 2019; Unilever Foods.

(Continued)

*Primary Examiner* — Drew E Becker
(74) *Attorney, Agent, or Firm* — Ipsilon USA—NLO

(57) ABSTRACT

The present invention relates to a savoury food article consisting of a solid, savoury composition having an elongate member extending therefrom, and also to a method for preparing such a savoury article and to the use of such a savoury article.

9 Claims, No Drawings

(56)               References Cited

U.S. PATENT DOCUMENTS

| | | | |
|---|---|---|---|
| 2014/0120222 A1 * | 5/2014 | Schroeder .............. A23P 10/28 |
| | | | 426/589 |
| 2015/0010684 A1 | 1/2015 | Gay |
| 2015/0025158 A1 | 1/2015 | Skorge et al. |
| 2015/0204548 A1 | 7/2015 | Miller |
| 2016/0324207 A1 * | 11/2016 | Briganti ................ A23G 3/346 |
| 2018/0192683 A1 | 7/2018 | Lane et al. |
| 2020/0178585 A1 * | 6/2020 | Mellema ................ A23L 19/00 |
| 2020/0345047 A1 * | 11/2020 | Okada .................... A23L 27/10 |
| 2021/0030041 A1 * | 2/2021 | Gaddipati .............. A23L 33/21 |
| 2022/0022504 A1 * | 1/2022 | Carola ................... A23L 23/10 |
| 2022/0046975 A1 * | 2/2022 | Skulec ................... A23L 25/30 |
| 2022/0061563 A1 * | 3/2022 | Huo ..................... A47G 21/004 |
| 2022/0095655 A1 | 3/2022 | Grudke-Katschus et al. |

FOREIGN PATENT DOCUMENTS

| | | | |
|---|---|---|---|
| CN | 1343099 | 4/2020 | |
| DE | 2938596 | 5/1982 | |
| DE | 3538805 | 5/1987 | |
| EP | 0026102 | 4/1983 | |
| EP | 0 087 847 A1 | 9/1983 | |
| EP | 0512249 | 11/1992 | |
| EP | 0910957 | 3/2000 | |
| EP | 1166645 | 1/2002 | |
| EP | 1214895 | 6/2002 | |
| EP | 1214895 A1 * | 6/2002 | .......... A23L 1/0005 |
| EP | 1216640 | 6/2002 | |
| EP | 1241216 | 9/2002 | |
| EP | 2509449 B1 * | 8/2013 | .......... A23L 1/0522 |
| EP | 3123875 A1 * | 2/2017 | ............. A23L 23/10 |
| FR | 2661317 | 10/1991 | |
| GB | 1019552 | 9/1962 | |
| JP | 2005261225 | 9/2005 | |
| JP | 2009148254 | 7/2009 | |
| JP | 2016111972 | 6/2016 | |
| WO | WO0054609 | 9/2000 | |
| WO | WO0247519 | 6/2002 | |
| WO | WO-0247519 A1 * | 6/2002 | ............. A23L 23/10 |
| WO | WO2004108767 | 12/2004 | |
| WO | WO2007007243 | 1/2007 | |
| WO | WO2007009600 | 1/2007 | |
| WO | WO2011069885 | 6/2011 | |
| WO | WO2012083410 | 6/2012 | |
| WO | WO2012119765 | 9/2012 | |
| WO | WO2016066383 | 5/2016 | |
| WO | WO2017021069 | 2/2017 | |
| WO | WO-2017021069 A1 * | 2/2017 | ............. A23L 23/10 |
| WO | WO-2017021071 A1 * | 2/2017 | ............. A23L 23/10 |
| WO | WO-2017021073 A1 * | 2/2017 | ............. A23L 23/10 |
| WO | WO2017186514 | 2/2017 | |
| WO | WO-2017032685 A1 * | 3/2017 | ............. A23L 23/10 |
| WO | WO-2017089174 A1 * | 6/2017 | ............. A23D 7/005 |
| WO | WO2018108431 | 6/2018 | |
| WO | WO2019015932 | 1/2019 | |

OTHER PUBLICATIONS

Verburgh; Patentability Search Report PCT088783; Patentability Search Report PCT088783; Feb. 14, 2019.

Rahman et al., Food Preservation by Freezing, Handbook of Food Preservation; 2007; 635-665.

Lewis et al., Thermal Processing, Food Processing Handbook; 2012; 31-75.

Miyazaki et al.: "Recent advances in application of modified starches for breadmaking", Trends in Food Science & Technology, 17 (2006) p. 591-59.

Tester et al.: "Annealing of starch—a review", International Journal of Biological Macromolecules, 27 (2000) p. 1-12.

Huang et al., Common knowledge reference 1 (Production Technology and Application of Resistant Starch; 2017; Jan. 31, 2017; 3.

Zhang, Food emulsifier; China Light Industry Press; pp. 592; 1996; Aug. 30, 1996; 2.

Zhao, Principles of Food Technology the 1st Edition; China Light Industry Press; pp. 194; 2002; Jul. 31, 2002; 3.

* cited by examiner

SAVOURY COMPOSITION

TECHNICAL FIELD OF THE INVENTION

The present invention relates to a savoury food article, a method of preparing such an article and to the use of such an article to prepare a savoury meal.

BACKGROUND OF THE INVENTION

Savoury compositions, such as bouillon or soup powders or bouillon or soup cubes are typically used to prepare a ready-to-eat savoury meal in the home environment (e.g. a bouillon, a soup, a sauce or a gravy). The powder or cube needs to be stirred in a container and heated to prepare the savoury meal.

Consumers desire a simple way to prepare savoury meals both at home and away from home. Outside the home, the consumer experiences several disadvantages when preparing a savoury meal from a savoury composition of the prior art. In the case of powders, the correct amount of powder needs to be added. This can be achieved by portioning the savoury composition into single-servings or adding a measured amount by e.g. a spoon from tub. However, a tub of savoury composition is not ideal as it is cumbersome and does not lend itself to easily preparing a savoury meal on-the-go.

The consumer also wants to use savoury compositions that look appealing and are perceived as clean label.

Attempts have been made to overcome some of these disadvantages. For example, GB 1 019 552 describes a packaging system in the form of a spoon in which a concentrated product is arranged in the bowl of the spoon and is covered and held in place by a heat-sensitive film. Upon contact with hot water, the plastic film becomes partially or completely detached to release the soluble concentrated product.

Such a system is not ideal because a shred of plastic remains secured to the spoon or remains in the beverage, and this considerably hampers the use of the spoon or consumption of the beverage reconstituted in this way.

WO0247519 describes an assembly comprising a utensil for holding or stirring, secured to a mass of cooking aid made up of 25 to 40% of fats which are solid at ambient temperature, 20 to 70% of flavourings and 5 to 50% of binders. However, such an assembly has an unacceptable fat content for the consumer.

A further disadvantage of the WO 0247519 is that on transport the assembly is not stable. The high fat content means that the assembly is prone to fat exudation, leading to an unappetizing appearance. Also, the soft nature of the cooking aid is prone to being dented and bashed during transport, again leading to an unappetizing appearance for the consumer. Also, the high fat content leads to unsightly fat staining of the packaging.

It is an object of the present invention to provide an easy to use savoury composition that is stable under transport conditions.

It is an object of the present invention to provide a savoury composition that dissolves quickly and has an appetizing appearance.

SUMMARY OF THE INVENTION

The inventors of the present invention have developed an improved process for the preparation of a savoury food article for preparing a soup or broth. Accordingly, there is provided a process for the preparation of a savoury food article comprising the steps of:

i) preparing a savoury composition by combining an edible salt, plant matter with particulate, binding agent, ii) adding water to the savoury composition while mixing, wherein the amount of water ranges from 10% to 20 wt. % by weight of the savoury composition, iii) filling a mould with the savoury composition and placing an elongate member in the savoury concentrate such that said elongate member extends from the savoury composition, iv) removing the savoury composition together with the elongate member from the mould to provide a savoury food article consisting of a savoury composition having an elongate member extending therefrom, v) drying the savoury food article at a temperature in the range of 20 to 50° C. for between 3 minutes and 24 hours, preferably to a water content of less than 10 wt. %, by weight of the savoury composition.

It has been found that adding water to the savoury composition while mixing, wherein the amount of water ranges from 5% to 20 wt. % by weight of the savoury composition in the process of the present invention enables a savoury composition to be prepared that can be removed together from the mould without sticking to the mould. Advantageously, the mould does not need to be heated to effect solidification of the savoury composition therefore saving energy.

In a second aspect, the present inventors have found a savoury food article for preparing a soup or broth consisting of a solid, savoury composition having an elongate member extending therefrom, wherein the savoury composition comprises:

a) 1 to 15 wt. % of an edible salt selected from sodium chloride, potassium chloride and combinations thereof, based on the total weight of the composition;

b) 0.2 to 25 wt. % of a fat component, based on the total weight of the composition;

c) 1 to 60 wt. % of plant matter selected from vegetables, herbs, spices and combinations thereof, based on the total weight of the composition; and d) 1 to 25 wt. % binding agent selected from the group consisting of saccharides and polysaccharide, e) less than 5 wt. % water, based on the total weight of the composition, wherein the sum of a), b), c) and d) constitutes at least 70 wt. % of the food composition.

The present invention further relates to a savoury food article consisting of a savoury composition having an elongate member extending therefrom

DETAILED DESCRIPTION OF THE INVENTION

The word 'comprising' as used herein is intended to mean 'including' but not necessarily 'consisting of' or 'composed of'. In other words, the listed steps or options need not be exhaustive.

Unless specified otherwise, numerical ranges expressed in the format 'from x to y' or 'x-y' are understood to include x and y. When for a specific feature multiple preferred ranges are described in the format 'from x to y' or 'x-y', it is understood that all ranges combining the different endpoints are also contemplated. For the purpose of the invention ambient temperature is defined as a temperature of about 20° C.

Unless indicated otherwise, weight percentages (wt. %) are based on the total weight of the composition.

The term "shape retaining savoury concentrate" as used herein means a composition that at 20° C. does not flow and retains a shape, i.e. may be a block, cube, oblong, cylinder, sphere etc.

The term "solid" as used herein means a material consisting of a network of particles that together form a shaped material. The term "solid" as used herein that may be porous.

The term "particulate" as used herein in relation to a material, refers to a savoury composition that consists of discrete particles, preferably discrete particles having an average particle size of at least 10 μm. Particle size distributions of particulate components can suitably be determined with a set of sieves of different mesh sizes. The average particle size as referred to herein is the volume weighted average particle size that can be measured by the skilled person using conventional methods, for example by sieve analysis.

The term 'bulk density' as used herein, unless indicated otherwise, refers to freely settled bulk density. Bulk density can be measured using the method of DIN:ISO 697:1981-03.

There is provided a process for the preparation of a savoury food for preparing a soup or broth article comprising the steps of:

i) preparing a savoury composition by combining an edible salt, plant matter with particulate, binding agent, ii) adding water to the savoury composition while mixing, iii) filling a mould with the savoury composition and placing an elongate member in the savoury concentrate such that said elongate member extends from the savoury composition, iv) removing the savoury composition together with the elongate member from the mould to provide a savoury food article consisting of a savoury composition having an elongate member extending therefrom, v) drying the savoury food article at a temperature in the range of 20 to 50° C. for between 3 minutes and 24 hours to a water content of preferably less than 10 wt. %, by weight of the savoury composition.

Preferably, the savoury composition comprises:

a) 1 to 15 wt. % of an edible salt selected from sodium chloride, potassium chloride and combinations thereof, based on the total weight of the composition;

b) 1 to 25 wt. % of a fat component, based on the total weight of the composition;

c) 1 to 45 wt. % of plant matter selected from vegetables, herbs, spices and combinations thereof, based on the total weight of the composition; and d) 1 to 30 wt. % binding agent selected from the group consisting of saccharides and polysaccharides, preferably the saccharide or polysaccharide binding agent is glucose or a glucose containing polysaccharide, preferably wherein the saccharide or polysaccharide is selected from the group consisting of glucose, maltodextrin, expanded, gelatinized potato starch and mixtures thereof, most preferably wherein the binding agent is expanded, gelatinized potato starch.

Preferably, the savoury composition is provided by mixing the dry ingredients, typically the edible salt and plant matter with the fat, if present, in the molten state before admixing the saccharide or polysaccharide.

Preferably, the savoury composition is prepared by mixing: edible salt selected from sodium chloride, potassium chloride and combinations thereof, plant matter selected from vegetables, herbs, spices and combinations thereof, and saccharide or polysaccharide, with a fat component, said fat being in a molten state.

While mixing the savoury concentrate water is added. Preferably, the amount of water added preferably ranges from 5 to 20 wt. % by weight of the savoury composition, more preferably in the range of 7 to 15 wt. %, even more preferably in the range 10 to 15 wt. %, by weight of the savoury composition.

The mould for forming shaped savoury composition may be any mould suitable for use with food ingredients, for example a plastic or silicon mould. Preferably a silicon mould is used. In some cases, vibration may be applied to remove the savoury composition from the mould.

Preferably, pressure is applied to the mould after step iii). Typically, pressure can be applied by placing a weight on top of the mould, preferably a weight of 1-5 kg is applied.

The mixing in step i) and step ii) is preferably carried out at a temperature ranging from 10° C. to 30° C., more preferably at a temperature ranging from 15° C. to 30° C.

Preferably, the drying in step v) is carried out in a drying chamber. Preferably, drying the savoury food article is done at a temperature in the range of 20 to 50° C., preferably 30 to 40° C. for between 1 hour and 24 hours, preferably between 5 and 15 hours, to preferably provide a water content of preferably less than 10 wt. %, by weight of the savoury composition, more preferably less than 5 wt. %.

In a second aspect, there is provided a savoury food article for preparing a soup or broth consisting of a solid, savoury composition. The savoury composition in contact with the elongate member is preferably present in an amount corresponding to an individual portion of a savoury meal, for example a soup or broth. The savoury food article typically contains a savoury composition having a unit weight between 1 and 50 g, preferably between 2 and 25 g, more preferably between 3 and 22 g, and even preferably between 4 and 20 g, most preferably between 5 and 15 g.

Typically, the savoury composition has a hardness in the range of 50 to 1000 N, preferably 100 to 800 N, more preferably 120 to 750 N, even more preferably 150 to 500 N. The hardness is defined as the maximum pressure that is encountered divided by the surface of the probe in touch with the cube. The hardness of the composition may be suitably measured with an equipment such as a MultiTest 50 Tablet Hardness Tester Pharmatron Dr. Schleuniger, manufactured by SOTAX AG. Parameters used to measure the hardness of the composition are typically:

i. Hardness Force: 50N/s
ii. Hardness method: linear force

Machine Set:
i. Mode: manual
ii. Test order: any
iii. Backoff: 3.00 mm

Units:
i. Hardness: N
ii. Length: mm
iii. Weight: g

Preferably, the plant matter is contained in a solid (at 20° C.), particulate matrix comprising edible salt and polysaccharide or saccharide. The plant matter may be vegetable or fruit matter. Preferably the plant matter is plant matter, not being limited to powdered, sliced, diced, cubed, macerated, or otherwise comminute pieces of vegetables. It has been found that the particulate matrix enables plant matter to be distributed in an attractive way in the savoury food article.

The savoury composition preferably comprises at least 1 wt. %, more preferably at least 10 wt. % and most preferably at least 25 wt. % of plant matter, said plant matter being selected from vegetables, herbs, spices, fruit and combinations thereof, said plant material preferably having a mesh size in the range of 0.2-10 mm.

Typically, the savoury composition contains 1 to 60 wt. %, more preferably 2-55 wt. % and most preferably 5-45 wt. % of plant matter preferably having a mesh size in the range of 0.2-10 mm.

Examples of plant matter include vegetables, herbs, spices, fruit, nuts, grains, and combinations thereof. Preferably the tissue material is edible material selected from vegetables, herbs, spices and fruit.

Typically, at least 80 wt. % of the plant matter has a particle size in the range of 10-2000 μm. Even more preferably at least 80 wt. % of the plant matter has a particle size in the range of 50-1500 μm. Most preferably, at least 80 wt. % of the edible salt has a particle size in the range of 100-1000 μm.

The composition typically comprises 5-50 wt. % of meat material selected from meat pieces, meat flavour, and combinations thereof. Preferably, the composition comprises 10-40 wt. %, even more preferably 15-30 wt. % of meat material. Preferably at least 80 wt. % of said particulate meat material passes a sieve with apertures of 2000 μm.

Salt

Preferably, the composition comprises 1-15 wt. %, more preferably 2-10 wt. %, even more preferably 3-8 wt. %, of the edible salt, selected from sodium chloride, potassium chloride and combinations thereof. Preferably the edible salt is sodium chloride. Preferably, sodium chloride represents at least 50 wt. %, more preferably at least 80 wt. % and most preferably at least 98 wt. % of said edible salt.

The edible salt which is employed in accordance with the invention preferably has a mass weighted average diameter in the range of 10-2000 μm, more preferably in the range of 100-1200 μm, and most preferably in the range of 200-800 μm.

Typically, at least 80 wt. % of the edible salt has a particle size in the range of 10-2000 μm. Even more preferably at least 80 wt. % of the edible salt has a particle size in the range of 50-1500 μm. Most preferably, at least 80 wt. % of the edible salt has a particle size in the range of 100-1000 μm.

Fat

Preferably, the composition comprises 1.5-20 wt. %, of a fat component, preferably 2-15 wt. % of a fat component, even more preferably 2.5-10 wt. % of a fat component, based on the total weight of the composition.

Fat may be present in the food composition as defined herein in relatively low amounts. Fat can be liquid fat or solid fat, preferably liquid fat, at ambient temperature, such as for example at 20° C. It can preferably be a fat selected from the group consisting of palm oil, sunflower oil, olive oil, rape seed oil and mixtures thereof. It can be a vegetable fat or an animal fat. Higher amounts are preferably prevented as they may result in fat staining of the packaging during storage or transport. Hence, preferably, the present invention relates to a food composition further comprising less than 20 wt. % of fat, preferably less than 15 wt. %, more preferably less than 10 wt. %, even more preferably less than 5 wt. % of fat.

Preferably, fat may be present in an amount of from 0.5 to 15 wt. % of fat, more preferably of from 1 to 10 wt. % of fat, most preferably of from 3 to 10 wt. % of fat, based on the weight of the food composition. It may be preferred that fat is absent. It is particularly preferred that the amount of solid fat at 20° C. is less than 10 wt. %, preferably less than 5 wt. %, even more preferably less than 1 wt. %, based on the total weight of the composition.

The total fat, preferably present in an amount as indicated in the paragraph here above, preferably has a solid fat content at 20° C. (N20) of 0 to 20%, preferably 1 to 15%.

The saccharide or polysaccharide binding agent is preferably glucose or a glucose containing polysaccharide. Preferably the saccharide or polysaccharide is selected from the group consisting of glucose, maltodextrin, expanded, gelatinized potato starch and mixtures thereof, most preferably wherein the binding agent is expanded, gelatinized potato starch.

Preferably, the saccharide is glucose. Glucose is a monosaccharide. Preferably, glucose is present in an amount of 2 to 20 wt. %, based on the total weight of the composition, preferably 5 to 15 wt. %, even more preferably 7 to 12 wt. %, based on the total weight of the composition.

Preferably, the polysaccharide is maltodextrin. Preferably, maltodextrin is present in an amount of 2 to 20 wt. %, based on the total weight of the composition, preferably 5 to 15 wt. %, even more preferably 7 to 12 wt. %, based on the total weight of the composition.

Maltodextrin consists of D-glucose units connected in chains of variable length. The glucose units are primarily linked with a($1\rightarrow4$) glyosidic bonds. Maltodextrin is typically composed of a mixture of chains that vary from three to 17 glucose units long.

Maltodextrins are classified by DE (dextrose equivalent) and have a DE between 3 and 20. The higher the DE value, the shorter the glucose chains, the higher the sweetness, the higher the solubility, and the lower heat resistance.

Preferably, the polysaccharide is expanded, gelatinized potato starch. Preferably, expanded, gelatinized potato starch is present in an amount of 2 to 20 wt. %, based on the total weight of the composition, preferably 5 to 15 wt. %, even more preferably 7 to 12 wt. %, based on the total weight of the composition.

It has been surprisingly found that by including expanded, gelatinized, potato starch particles provides a visually appealing savoury composition that can easily be used by the consumer for the preparation of savoury meals, and that is stable on transport.

The inventors postulate that the inclusion of gelatinized, expanded starch particles enables a stable network to be formed within the food concentrate providing a solid, savoury composition that is stable on transport.

The term "particulate, expanded, gelatinized potato starch" as used herein refers to starch that has undergone physical treatment resulting in the crystalline starch structure becoming an amorphous structure. Briefly, gelatinization is a process that breaks down the intermolecular bonds of starch molecules in the presence of water and heat, allowing the hydrogen bonding sites to engage more water. Penetration of water increases randomness in the general starch granule structure and decreases the number and size of crystalline regions. Under the microscope in polarized light starch loses its birefringence and its extinction cross during gelatinization. The extent to which the starch present has an amorphous structure can suitably be determined by cross polarised light microscopy. Expanded, gelatinized potato starch has a lower bulk density than native or pregelatinized starch.

The amorphous structure of particulate, expanded, gelatinized potato starch can be suitably visualized concentrate by means of XRT (X-ray micro computed tomography, also known as micro-CT) or SEM (scanning electron microscopy). The shattered, amorphous irregular structure lacking in birefringence of the expanded, gelatinized starch particles can suitably be recognised, compared to native (crystalline) starch.

The particulate, expanded, gelatinized potato starch of the present invention can be prepared by extrusion, e.g. by using an extrusion process as described in EP-A 0 087 847. In such an extrusion process, a starch material, e.g. starch comprising potato material, is fed into an extruder where the said material is heated in the presence of water and optionally a gas forming expanding agent to gelatinize the starch and to build up pressure. When the heat processed said material leaves the extruder, the pressure drop results in the formation of an extruded, i.e. gelatinized, starch structure. The extruded material can be milled or otherwise comminuted to produce the particulate, expanded, gelatinized potato starch.

According to the invention, at least 80 wt. % of the particulate, expanded, gelatinized potato starch passes a sieve with a mesh size of 1000 μm. Preferably at least 90 wt. % of the particulate, expanded, gelatinized potato starch pass a sieve with a mesh size of 1000 μm. More preferably at least 95 wt. % of the particulate, expanded, gelatinized starch component pass a sieve with a mesh size of 1000 μm. If the particles of the expanded, gelatinized potato starch in the savoury concentrate are too large, they are likely to lead to a grainy/gritty mouthfeel upon consumption of the diluted savoury concentrate.

Preferably, not more than 15 wt. % of the particulate, expanded, gelatinized potato starch passes a sieve with a mesh size of 100 μm or less, more preferably not more than 35 wt. % of the particulate, expanded, gelatinized starch component pass a sieve with a mesh size of 200 μm or less.

The particulate, expanded, gelatinized potato starch can be suitably visualized in the final savoury concentrate by means of XRT (X-ray micro computed tomography, also known as micro-CT) or SEM (scanning electron microscopy). The shattered, amorphous irregular structure lacking in birefringence of the expanded (gelatinized) starch particles can suitably be recognised, compared to native starch.

Preferably, the particulate, expanded, gelatinized potato starch has a bulk density of in the range of 50 to 200 g/L, more preferably in the range of 75 to 160 g/L, even more preferably in the range of 100 to 150 g/L. Preferably, the expanded, gelatinized starch component has a bulk density of at least 50 g/L, more preferably at least 80 g/L, even more preferably at least 100 g/L. Preferably, the expanded, gelatinized starch component has a bulk density of at most 200 g/L, more preferably at most 160 g/L and even more preferably at most 150 g/L.

An example of a suitable expanded, gelatinized potato starch is Aero-myl 33 (Südstärke, Germany).

The savoury composition, preferably has a water content of less than 10 wt. %, by weight of the savoury composition, preferably less than 7.5 wt. %, more preferably less than 5 wt. %, even more preferably less than 2.5 wt. %, most preferably less than 2 wt. %. The water content may be determined by standard methods, for example DIN 10236: 2001-12, PV01441, gravimetry.

The composition preferably comprises, by weight of the composition, 1-30 wt. %, preferably 2-20 wt. %, more preferably 5 to 1 10, wt. % of savoury taste giving ingredients, selected from glutamate, 5'-ribonucleotides, sucrose, glucose, fructose, lactic acid, citric acid and combinations thereof. Sucrose, glucose and fructose are preferably present in the savoury composition in a total amount of 0 to 10 wt. %, more preferably 1 to 4 wt. %, even more preferably 1.5 to 2.5 wt. %, based on the weight of the savoury composition.

Glutamate, for example monosodium glutamate, is preferably present in the savoury composition in an amount of 0 to 5 wt. %, more preferably 1 to 3 wt. %, based on the weight of the savoury composition.

Preferably, edible acids selected from the group of lactic acid, citric acid and combinations thereof, are present in the composition in an amount of 0 to 10 wt. %, more preferably 1 to 4 wt. %, even more preferably 1.5 to 2.5 wt. %, based on the weight of the savoury composition.

The savoury taste ingredients may be added as such or as part of a complex ingredient mixture. In a preferred embodiment, one or more of the savoury taste giving ingredients are provided by ingredients selected from the group consisting of yeast extract, hydrolysed vegetable protein, dry meat extract, dry spices, herbs and mixtures thereof.

The savoury composition according to the invention preferably comprises 0 to 5 wt. %, more preferably 0.1 to 1 wt. %, or even 0.5 to 2 wt. %, dry meat extract, based on the weight of the savoury composition.

The total amount of edible salt and savoury taste giving ingredients in the savoury composition is preferably 20 to 90 wt. %, preferably 30 to 80 wt. %, even more preferably 40 to 70 wt. %, based on the weight of the savoury composition. It is especially preferred that the total amount edible salt and savoury taste giving ingredients in the savoury composition is higher than that of the other non-fat ingredients, like fillers, flavour ingredients and water.

Preferably, the savoury composition comprises comprising 2 to 35 wt. % of starch components selected from native starches, wherein the native starch is preferably selected from the group consisting of corn starch, potato starch, tapioca starch, waxy corn starch, waxy rice starch, and wheat starch and combinations thereof.

The savoury composition preferably comprises less than 1 wt. % native starch selected from corn starch, potato starch, tapioca starch, waxy corn starch, waxy rice starch, wheat flour and wheat starch and combinations thereof.

The savoury composition preferably comprises less than 1 wt. % native starch and comprises 5 to 20 wt. % maltodextrin or expand, expanded, gelatinized potato starch, preferably 5 to 20 wt. % expand, gelatinized potato starch. Surprisingly it has been found that native starch can be dispensed with when the binding agent is maltodextrin or expand, expanded, gelatinized potato starch.

The savoury composition may also comprise a non-gelatinized starch, preferably selected from the group consisting of corn starch, potato starch, tapioca starch, waxy corn starch, waxy rice starch, and wheat starch.

Non-gelatinzed starch may be a physically modified, enzymatically modified or chemically modified starch.

"Physically modified starch" means a starch which has been subjected to a heat treatment in the presence of relatively small amounts of water or moisture. No other reagents are added to the starch during the heat treatment. The heat-treatment processes include heat-moisture and annealing treatments, both of which cause a physical modification of starch without any gelatinization, damage to granular integrity, or loss of birefringence (Miyazaki et al., Trends in Food Science & Technology 17 (2006) p. 591-599). Annealing represents 'physical modification of starch slurries in water at temperatures below gelatinisation' whereas heat-moisture treatment 'refers to the exposure of starch to higher temperatures at very restricted moisture content (18-27%)'. (Tester et al., International Journal of Biological Macromolecules 27(2000) p. 1-12). Physical modification should be distinguished from gelatinisation of starch, which usually is carried out by heating starch in an excess amount of water. Other terms which are used for this type of starch are "heat-treated starch" and "heat-modified starch".

"Enzymatically modified starch" means a starch which has been treated with one or more enzymes to modify its properties.

"Chemically modified starch" means a starch which has been reacted with reagents which have been added to the starch in order to form new covalent bonds between those molecules and the starch molecules.

Typically, the savoury composition comprises:
- a) 2 to 15 wt. % of an edible salt selected from sodium chloride, potassium chloride and combinations thereof, based on the total weight of the composition;
- b) 1 to 10 wt. % of a fat component, based on the total weight of the composition;
- c) 10 to 60 wt. % of plant matter selected from vegetables, herbs, spices and combinations thereof, based on the total weight of the composition; and
- d) 5 to 20 wt. % binding agent selected from the group consisting of saccharides and polysaccharide,
- e) less than 5 wt. % water, based on the total weight of the composition, wherein the sum of a), b), c) and d) constitutes at least 80 wt. % of the food composition.

Preferably, the savoury composition comprises:
- a) 2 to 5 wt. % of an edible salt selected from sodium chloride, potassium chloride and combinations thereof, based on the total weight of the composition;
- b) 1 to 5 wt. % of a fat component, based on the total weight of the composition;
- c) 10 to 55 wt. % of plant matter selected from vegetables, herbs, spices and combinations thereof, based on the total weight of the composition; and
- d) 5 to 20 wt. % binding agent selected from the group consisting of saccharides and polysaccharide,
- e) less than 5 wt. % water, based on the total weight of the composition,
- f) 1-20% proteinaceous matter.

wherein the sum of a), b), c) and d) constitutes at least 80 wt. % of the food composition Amounts, preferred amounts, ingredients and preferred ingredients etcetera as specified for the product apply also for the process mutatis mutandis, unless specified otherwise.

The savoury composition may preferably comprise proteinaceous matter. Suitable proteinaceous matter includes dairy protein and albumin. Preferably, the savoury composition comprises 2 to 15 wt. %, preferably 5 to 10 wt. % proteinaceous matter, based on the total weight of the savoury composition.

The savoury food article typically has a unit weight between 1 and 50 g, preferably between 2 and 25 g, more preferably between 3 and 22 g, and even preferably between 4 and 20 g, most preferably between 5 and 15 g.

Preferably, the savoury composition has a water activity of less than 0.8, preferably less than 0.65, more preferably less than 0.5, even more preferably less than 0.4, more preferably less than 0.3 and preferably more than 0.15. Preferably, the savoury composition has a water activity in the range of 0.15 to 0.8, even more preferably from 0.3 to 0.65.

The savoury article is preferably shape stable when shaken at 210 rpm for 2 hours at 20° C. It has been surprisingly found that the savoury article according to the invention does not crack, split or otherwise disintegrate, nor does the elongate member become detached, when the savoury article is subjected to a test simulating transport conditions. The term "shape stable" means that the savoury food article does not crack or disintegrate when shaken at 210 rpm for 2 hours at 20° C.

In a third aspect, the present invention relates to a savoury food article obtainable by a process defined herein, the savoury food article consisting of a savoury composition having an elongate member extending therefrom.

The savoury article as defined herein is preferably packaged. The present invention therefore relates in an aspect to a packaged savoury food article for preparing a soup or broth consisting of a solid, savoury composition having an elongate member extending therefrom, wherein the savoury composition comprises:
- a) 1 to 15 wt. % of an edible salt selected from sodium chloride, potassium chloride and combinations thereof, based on the total weight of the composition;
- b) 1 to 25 wt. % of a fat component, based on the total weight of the composition;
- c) 1 to 60 wt. % of plant matter selected from vegetables, herbs, spices and combinations thereof, based on the total weight of the composition; and
- d) 1 to 25 wt. % binding agent selected from the group consisting of saccharides and polysaccharides,
- e) less than 5 wt. % water, based on the total weight of the composition, wherein the sum of a), b), c) and d) constitutes at least 70 wt. % of the food composition. The packaged savoury food article is preferably contained in a wrapper. The wrapper may be any suitable food grade wrapper, for example a transparent, translucent or opaque packaging film. The packaging may contain one or more savoury food articles. Preferably, a packaging unit comprises at least one, preferably at least two savoury food articles as defined herein.

In another aspect, the present invention relates to a method for preparing a savoury meal comprising contacting a savoury food article as defined herein with water having a temperature of at least 80° C.

In yet another aspect, the present invention relates to the use of a savoury food article according as defined herein for preparing a savoury meal, preferably a soup.

EXAMPLES

Example 1

A savoury composition was prepared according to the recipe in table 1. First a base mix of salt, tomato powder, vegetable powder, yeast, creamer, fat powder, herbs and potato starch were mixed together and then added to areomyl, maltodextrin or glucose (as used according to Table 1) in a Thermomix (Thermomix 31-1 highest speed 10.700/min). The mixture was mixed for 10 seconds at the highest speed then water was added slowly over 10 seconds. The resultant mixture was mixed for 60 seconds.

TABLE 1

| Ingredient (Base) | Parts by weight |
|---|---|
| Salt | 37.5 |
| Vegetable powder[1] & herbs | 284 |
| Yeast | 25.75 |
| Creamer[2] | 45 |
| Liquid fat | 20 |
| Water | 5 |
| SUM | 417.25 |

[1]<5 mm particle size
[2]75% fat

In summary, 400 parts of the base mix of Table 1 was mixed with 80 parts of expanded, gelatinized potato starch (composition 1), maltodextrin (composition 2) or glucose (composition 3) and 50 parts of water as shown in Table 2:

TABLE 2

| | parts by weight | | |
|---|---|---|---|
| Ingredient | 1 | 2 | 3 |
| Base mix | 400 | 400 | 400 |
| Aeromyl (expanded gelatinized potato starch) | 80 | 0 | 0 |
| maltodextrin | 0 | 80 | 0 |
| Glucose | 0 | 0 | 80 |
| Water | 50 | 50 | 50 |

Comparative composition A (that does not contain Aeromyl, maltodextrin or glucose) and composition B which was prepared according to Example 1 and 3 of WO0247519.

TABLE 3

| Ingredient | A | B |
|---|---|---|
| Salt (crystalline) | 4.5 | 5.1 |
| Sucrose[1] | 0 | 6.2 |
| Vegetable powder and herbs[2] | 32 | 23 |
| Yeast | 3.0 | 0 |
| Creamer | 5.5 | 0 |
| Fat | 2.5 | 34 |
| Potato starch | 18.5 | 10.2 |
| Wheat flour | 0 | 20.4 |
| Aeromyl | 0 | 0 |
| Maltodextrin | 0 | 0 |
| Glucose | 0 | 0 |
| Water | 0 | 0 |

The mix was compressed by application of 2.5 kg pressure for 30 seconds to provide a tablet. A dissolution test was carried out by dissolving the tablet in 200 mL of hot water. The results are presented in Table 4:

TABLE 4

| Savoury article | Appearance of soup |
|---|---|
| 1 | Well dissolved, no fat eyes |
| 2 | Well dissolved, no fat eyes |
| 3 | Well dissolved table, no fat eyes |
| A | N/D - no tablet formed |
| B | Melts/dissolves with fat eyes |

Tablets 1, 2 and 3 were visually appealing prior to placing in hot water, dissolved quickly and did not produce fat eyes meaning the resultant soup was also visually appealing.

Example 2

A savoury food article was prepared using the savoury composition 4. A mould was filled with the savoury composition 4. A wooden stick was placed in the composition so that the stick extended from the mould. The mould was covered with a complimentary mould and pressed together with 1 kg of force. After 30 s the mould was opened and the savoury food article was removed from the mould.

TABLE 5

| Ingredient | 4 [g] |
|---|---|
| Salt (crystalline) | 4.5 |
| Sugar (sucrose; crystalline) | 0 |

TABLE 5-continued

| Ingredient | 4 [g] |
|---|---|
| Vegetable powder and herbs | 32 |
| Yeast | 3.0 |
| Creamer | 5.5 |
| Liquid fat | 2.5 |
| Potato starch | 0 |
| Wheat flour | 0 |
| Maltodextrin | 13.5 |
| Solid fat | 0 |

The savoury article of example 2 placed in a mug. Water was boiled in a kettle. The required amount of water (200 ml) was measured into a measuring cup, and from there transferred into the mug. The savoury food article was held by the stick and stirred until dissolved. The test was repeated with comparative sample B.

TABLE 6

| Savoury article | Dissolution time | Appearance |
|---|---|---|
| 4 | 30 secs | No fat eyes |
| B | 99 secs | Fat eyes |

Savoury article 4 was visually appealing prior to placing in hot water, dissolved quickly and did not produce fat eyes meaning the resultant soup was also visually appealing.

Transportation Test

Transport simulation involved placing the savoury article on a vibration table for 2 hours @210 rpm. This condition was being used for the transport test simulation within the EU.

TABLE 8

| Sample | Appearance before transport | Appearance after transport |
|---|---|---|
| 4 | Dry, solid block; | Dry, solid block; no change in appearance of packaging |
| B | Dry, solid block; | packaging stained by fat |

The invention claimed is:

1. A process for preparation of a savoury food article for preparing a soup or broth comprising the steps of:
   i) preparing a savoury composition by combining an edible salt, plant matter comprising particles, a fat component, and a binding agent, which are at a temperature ranging from 10° C. to 30° C.,
   ii) adding water to the savoury composition while mixing at the temperature ranging from 10° C. to 30° C., wherein the amount of water ranges from 10 to 20 wt. %, by weight of the savoury composition,
   iii) filling a mould with the savoury composition and placing an elongate member in the savoury concentrate such that said elongate member extends from the savoury composition,
   iv) removing the savoury composition together with the elongate member from the mould to provide a savoury food article consisting of a savoury composition having an elongate member extending therefrom, and
   v) drying the savoury food article to provide a water content of less than 10 wt. %, by weight of the savoury composition
   wherein the fat component is liquid fat at 20° C.

2. The process according to claim 1, wherein the savoury composition comprises:

a) 1 to 15 wt. % of edible salt selected from sodium chloride, potassium chloride and combinations thereof, based on the total weight of the composition;

b) 1 to 25 wt. % of the fat component, based on the total weight of the composition;

c) 1 to 45 wt. % of plant matter selected from vegetables, herbs, spices and combinations thereof, based on the total weight of the composition; and d) 1 to 30 wt. % of binding agent selected from the group consisting of saccharides and polysaccharides.

3. The process according to claim 1, wherein pressure is applied to the savoury composition after step iii).

4. The process according to claim 1, wherein the drying in step v) is carried out in a drying chamber having a temperature in the range of 20° C. to 50° C.

5. The process according to claim 1, wherein the binding agent is selected from: glucose; maltodextrin; expanded, gelatinized potato starch; and mixtures thereof.

6. The process according to claim 3, wherein the pressure is applied by placing a weight of 1-5 kg on top of the mould.

7. The process according to claim 1, wherein the savoury composition comprises less than 20 wt. % of fat.

8. A process for preparation of a savoury food article for preparing a soup or broth comprising the steps of:

i) preparing a savoury composition by combining an edible salt, plant matter comprising particles, and a binding agent at a temperature ranging from 10° C. to 30° C., ii) adding water to the savoury composition while mixing at the temperature ranging from 10° C. to 30° C., wherein the amount of water ranges from 5 to 20 wt. %, by weight of the savoury composition, iii) filling a mould with the savoury composition and placing an elongate member in the savoury concentrate such that said elongate member extends from the savoury composition, iv) removing the savoury composition together with the elongate member from the mould to provide a savoury food article consisting of a savoury composition having an elongate member extending therefrom, and v) drying the savoury food article to provide a water content of less than 10 wt. %, by weight of the savoury composition wherein the savoury food article has a total solid fat content at 20° C. of 0 to 5 wt. % based on the total weight of the composition and 1 to 8 wt. % of the edible salt based on the total weight of the composition.

9. The process according to claim 8, wherein the savoury composition is prepared in step i) by mixing the edible salt and the plant matter together with a fat component prior to admixing the binding agent, wherein the fat component is in a liquid state.

\* \* \* \* \*